United States Patent [19]
Ueno et al.

[11] Patent Number: 5,574,785
[45] Date of Patent: Nov. 12, 1996

[54] ENCIPHERED COMMUNICATION SYSTEM

[75] Inventors: Tomoyuki Ueno; Mitsuru Seta, both of Kawasaki, Japan

[73] Assignee: Fujitsu Limited, Kanagawa, Japan

[21] Appl. No.: 365,915

[22] Filed: Dec. 29, 1994

[30]    Foreign Application Priority Data

May 31, 1994 [JP] Japan .................................. 6-117828

[51] Int. Cl.⁶ ........................................................ H04L 9/00
[52] U.S. Cl. .............................. 380/2; 380/9; 380/21; 380/49
[58] Field of Search ........................... 380/2, 9, 20, 21, 380/28, 48, 49

[56]    References Cited

U.S. PATENT DOCUMENTS

| | | | |
|---|---|---|---|
| 3,244,806 | 4/1966 | Morris | 380/20 X |
| 3,466,385 | 9/1969 | Hendrickson | 380/20 X |
| 3,538,242 | 11/1970 | Hepner | 380/20 X |
| 5,297,208 | 3/1994 | Schlafly et al. | 380/49 |
| 5,392,352 | 2/1995 | Han | 380/9 X |
| 5,432,848 | 7/1995 | Butter et al. | 380/2 |

*Primary Examiner*—Bernarr E. Gregory

[57]    ABSTRACT

An enciphered communication system is provided which has a plurality of cipher keys selectively used for enciphering data, wherein even when a cipher key number used at a transmitting side is not correctly transmitted to a receiving side, the receiving side can change the cipher key to a correct one. A transmitter has appendant data affixing means for affixing appendant data to information to be enciphered, and a receiver has appendant data detecting means for detecting the appendant data from deciphered data, and cipher key determining means for successively changing the cipher key of the receiver when the appendant data is not accurately detected. Consequently, when the cipher key is changed, for example, the receiving side itself can restore data even if the cipher key number is not correctly transmitted thereto.

13 Claims, 17 Drawing Sheets

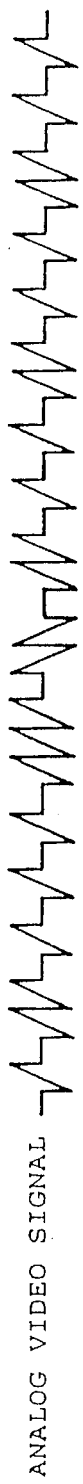
FIG.13A  ANALOG VIDEO SIGNAL
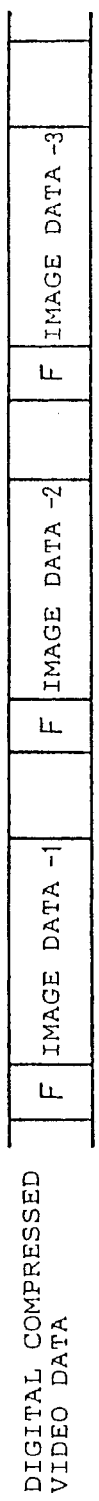
FIG.13B  DIGITAL COMPRESSED VIDEO DATA
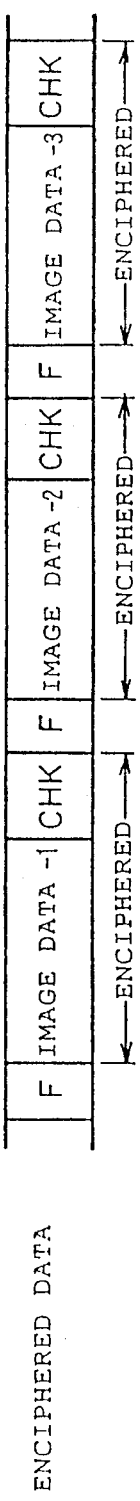
FIG.13C  ENCIPHERED DATA
FIG.13D  RADIO WAVE
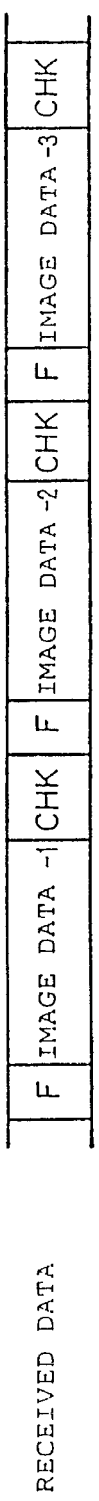
FIG.13E  RECEIVED DATA
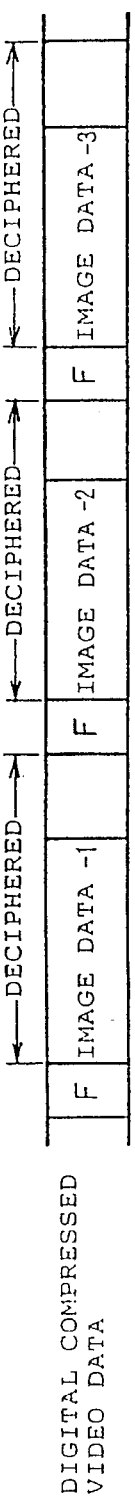
FIG.13F  DIGITAL COMPRESSED VIDEO DATA
FIG.13G  ANALOG VIDEO SIGNAL

ENCIPHERED COMMUNICATION SYSTEM

BACKGROUND OF THE INVENTION

(1) Field of the Invention

The present invention relates to an enciphered communication system, and more particularly, to a system for enciphered communications in a data communication system wherein a plurality of cipher keys are used for enciphering data and are switched as required.

(2) Description of the Related Art

Conventionally, measures are taken to encipher secret data before transmission so that the contents of the data may be unintelligible even if intercepted during transmission via a communication line. Enciphering methods include DES (Data Encryption Standard) and FEAL (Fast data Encipherment ALgorithm) using secret or publicly open cipher keys, and an identical cipher key is used at transmitting and receiving sides to accomplish normal data communications.

FIG. 16 illustrates the configuration of a conventional enciphered communication system. As shown in FIG. 16, the conventional enciphered communication system comprises a transmitter 1 for enciphering and transmitting data, and a receiver 2 for receiving and deciphering the enciphered data. A transmission line 3 connecting the transmitter 1 and the receiver 2 is not particularly limited, and may be of a wired type such as a telephone line or a wireless type as used in communications utilizing a satellite. FIG. 16 illustrates only the enciphering/deciphering-related parts of the transmitter 1 and the receiver 2.

The transmitter 1 includes a data enciphering section 11 for enciphering input data by means of a cipher key ks, a cipher key table 12 for converting a specified number N(ks) to a cipher key ks, a cipher key number setting section 13 for setting a number N(ks) by which a cipher key ks in the cipher key table 12 is selected to be used for enciphering the input data, a cipher key number sending section 14 for sending the cipher key number N(ks) selected by the cipher key number setting section 13 to the receiver 2, and a multiplexing section 15 for multiplexing the enciphered data and the cipher key number N(ks).

The receiver 2 includes a separating section 21 for receiving data transmitted via the transmission line 3 and separating the received data into enciphered data and a cipher key number, a cipher key number receiving section 22 for receiving the separated cipher key number, a cipher key table 23 having the same contents as the cipher key table 12 of the transmitter 1, and a data deciphering section 24 for deciphering the separated enciphered data by means of a cipher key ks specified by the cipher key number N(ks)'.

Thus, the transmitter 1 and the receiver 2 have identical cipher key tables 12 and 23, respectively, each having a plurality of cipher keys, and only the cipher key number corresponding to the cipher key which is used to encipher the transmit data is transmitted to the receiver 2. The receiving side decodes the received data to acquire the cipher key number, and obtains the same cipher key as used at the transmitting side from the cipher key number to decipher the enciphered data. This arrangement permits the cipher key number to be changed as needed, and also ensures high-secrecy transmission because the cipher key itself is not transmitted.

FIG. 17 schematically illustrates data on a transmission line of the conventional enciphered communication system. As shown in FIG. 17, the data transmitted onto the transmission line 3 from the transmitter 1 consists of input data D enciphered by the data enciphering section 11, the cipher key number N(ks) output from the cipher key number sending section 14 and multiplexed at the multiplexing section 15, and frame synchronizing signals F. The cipher key number N(ks) is usually transmitted only when it has been changed; in some cases, the cipher key number is transmitted at the start of data communication or at regular intervals, or is transmitted with each of frames.

In the conventional enciphered communication system having a plurality of cipher keys, information about the cipher key number is transmitted from the transmitter to the receiver. Thus, if one of data items relating to the cipher key number, among the information transmitted when the cipher key number is changed, is accidentally in error, for example, all the other received data becomes erroneous because the receiver deciphers the received data by means of the cipher key corresponding to the previously notified cipher key number, making normal deciphering impossible. In such cases, moreover, received data continues to become erroneous until the cipher key number is correctly notified.

In the case of a two-way communication system, retransmission of the cipher key number can be requested upon detection of discrepancy between the cipher key numbers. However, in a one-way communication system such as a broadcasting system which allows no such retransmission request, received data continues to become erroneous until the cipher key number is correctly notified.

SUMMARY OF THE INVENTION

One object of the present invention is to provide an enciphered communication system which uses a plurality of cipher keys and which is capable of changing an erroneously notified cipher key number to a correct cipher key number in cases where the cipher key number is transmitted only infrequently, for example, at the time when the cipher key is changed.

Another object of the present invention is to provide an enciphered communication system wherein a receiving side can find the same cipher key number as used at a transmitting side even in cases where the cipher key number itself is not transmitted and, when the cipher key is changed, the receiving side follows such change and obtains the same cipher key number as used at the transmitting side.

Still another object of the present invention is to provide an enciphered communication system in which all transmitted data can be received without any error being caused.

To achieve the above objects, there is provided according to the present invention an enciphered communication system having a plurality of cipher keys to be switched as required. The enciphered communication system comprises a transmitter including appendant data affixing means for affixing appendant data to input data to be enciphered, and enciphering means having a plurality of cipher keys selectively used for enciphering the input data and the appendant data output from the appendant data affixing means, and a receiver including deciphering means for deciphering the enciphered data received via a transmission line, appendant data detecting means for detecting the appendant data affixed to the input data, and cipher key determining means for determining whether a cipher key used for the deciphering is correct, based on an error rate of the detected appendant data, and for instructing the deciphering means to change the cipher key used for the deciphering when it is judged that the cipher key is not correct.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a chart schematically showing data at various parts in a digital image broadcasting system;

DESCRIPTION OF THE PREFERRED EMBODIMENTS

Embodiments according to the present invention will be described in detail.

Figure 1:
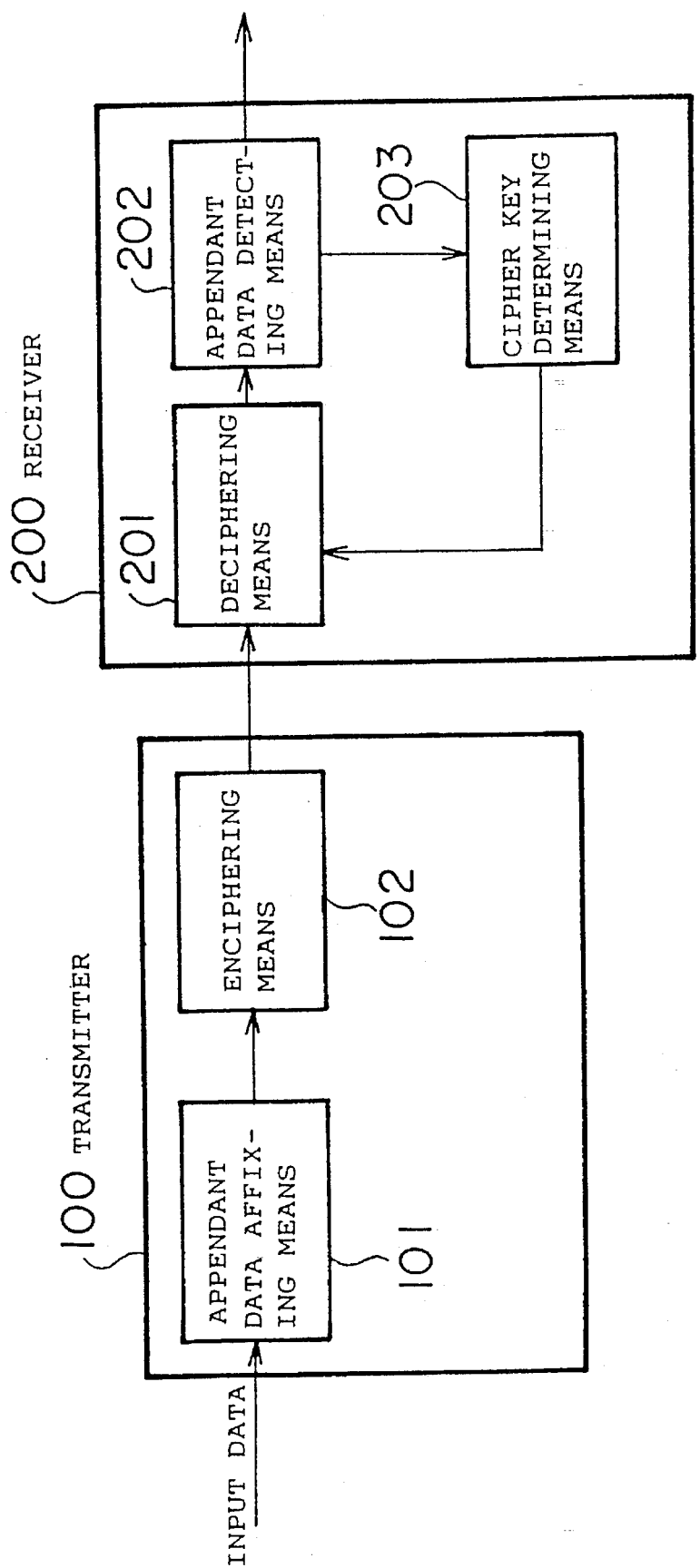
FIG. 1 is a diagram illustrating the principles of the present invention.

FIG. 1 is a diagram illustrating the principles of the present invention. In an enciphered communication system according to the present invention, a transmitter 100 comprises appendant data affixing means 101 for affixing appendant data to input data to be enciphered, and enciphering means 102 for enciphering each of the input data and appendant data output from the appendant data affixing means 101, and a receiver 200 comprises deciphering means 201 for deciphering the enciphered data received via a transmission line, appendant data detecting means 202 for detecting the appendant data affixed to the input data, and cipher key determining means 203 for causing the deciphering means 201 to change a cipher key used for the deciphering, in accordance with an error rate of the detected appendant data.

In the transmitter 100, the appendant data, which allows the occurrence of an error on the transmission line to be detected, is affixed to the input data to be enciphered, and the appendant data and the input data are enciphered at the enciphering means 102. The enciphering means 102 has a table including a plurality of cipher keys, and occasionally changes the cipher key used for the enciphering as required. In the receiver 200, the deciphering means 201 deciphers the received data, and the appendant data detecting means 202 detects the appendant data from the deciphered data. The cipher key determining means 203 first calculates the error rate of the detected appendant data, and if the calculated error rate is small, judges that an error has occurred on the transmission line. If the error rate is greater than a predetermined value, the determining means 203 judges that an erroneous cipher key is used by the deciphering means 201, and instructs the deciphering means 201 to use a different cipher key. Thus, a correct cipher key is always selected and used at the receiving side.

Figure 2:
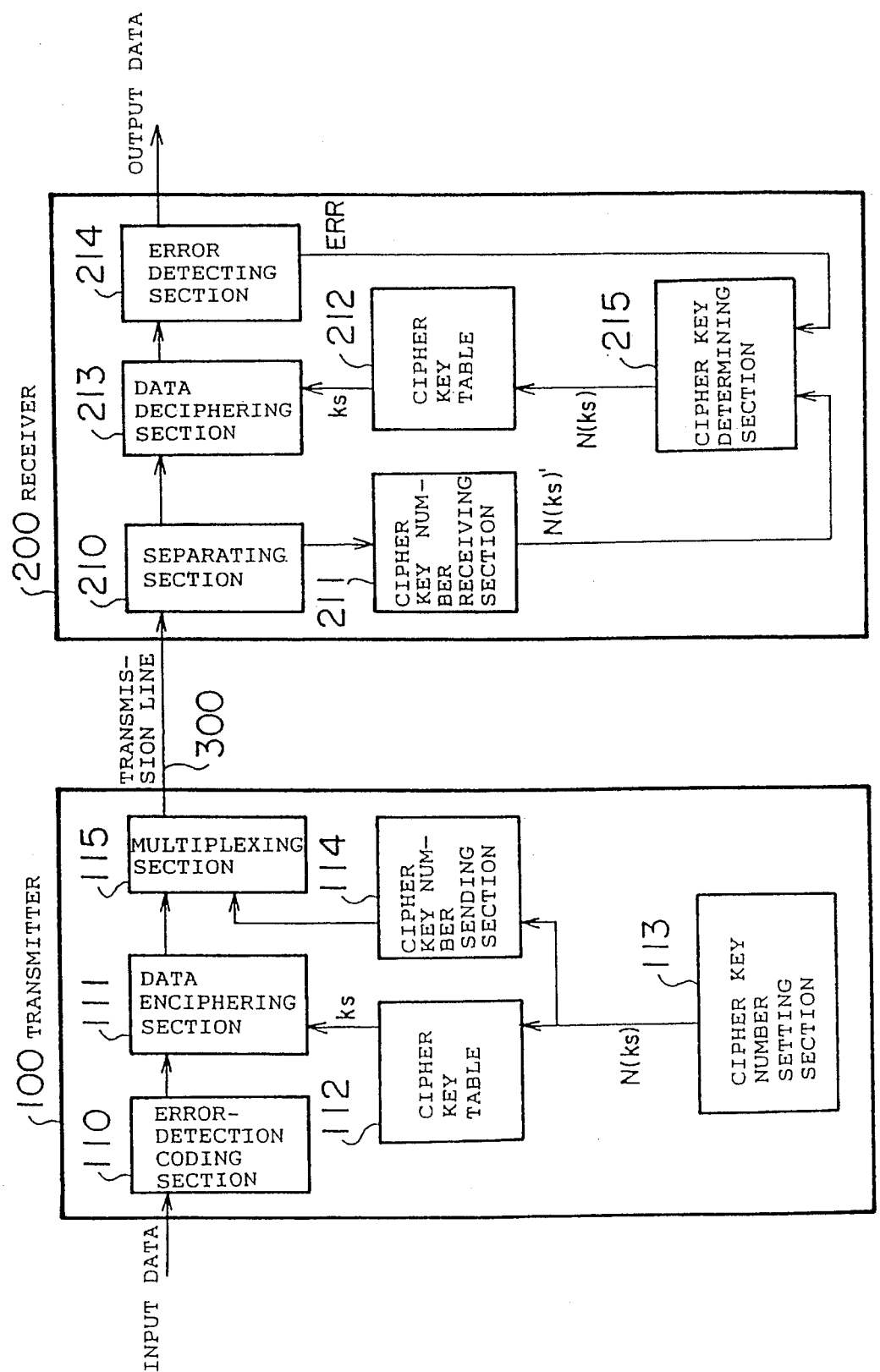
FIG. 2 is a diagram illustrating the configuration of an enciphered communication system according to a first embodiment of the present invention.

FIG. 2 illustrates the configuration of an enciphered communication system according to a first embodiment of the present invention. As shown in the figure, the enciphered communication system of the present invention comprises a transmitter 100, a receiver 200, and a transmission line 300 connecting the transmitter and the receiver.

The transmitter 100 includes an error-detection coding section 110 for receiving input data and affixing an error-detecting code to the input data. The error-detection coding section 110 corresponds to the appendant data affixing means 101 in FIG. 1 illustrating the principles of the invention, and for the error-detecting code, an error-detecting/correcting code such as a parity-checking code, a BCH (Bose-Chaudhuri-Hocquenghem) code, or a convolutional code is used. The transmitter 100 further includes a data enciphering section 111 for enciphering the input data by means of a cipher key ks, a cipher key table 112 for converting a specified number N(ks) to a cipher key ks, a cipher key number setting section 113 for setting a number N(ks) by which a cipher key ks in the cipher key table 112 is selected to be used for enciphering the input data, a cipher key number sending section 114 for sending the cipher key number N(ks) selected by the cipher key number setting section 113 to the receiver 200, and a multiplexing section 115 for multiplexing the enciphered data and the cipher key number N(ks), these elements corresponding to the enciphering means 102 in FIG. 1 illustrating the principles of the present invention.

The receiver 200 includes a separating section 210 for receiving data transmitted via the transmission line 300 and separating the received data into the enciphered data and the cipher key number, a cipher key number receiving section 211 for receiving the separated cipher key number, a cipher key table 212 having the same contents as the cipher key table 112 of the transmitter 100, and a data deciphering section 213 for deciphering the separated enciphered data by means of a specified cipher key ks. These elements correspond to the deciphering means 201 in FIG. 1 illustrating the principles of the invention. The receiver 200 further includes an error detecting section 214 for detecting the error-detecting code in the data deciphered by the data deciphering section 213 and for identifying erroneous bit(s), and a cipher key determining section 215 for causing the cipher key being used for the deciphering to be changed in accordance with the number of errors detected within a fixed time by the error detecting section 214, i.e., the error rate. The error detecting section 214 corresponds to the appendant data detecting means 202 in FIG. 1, and the cipher key determining section 215 corresponds to the cipher key determining means 203.

Thus, the transmitter 100 and the receiver 200 are each provided with a plurality of cipher keys, a cipher key number is allotted to each cipher key, and a collation table consisting of the cipher keys and the cipher key numbers corresponding thereto is stored in each of the cipher key tables 112 and 212. When the cipher key is to be changed, the cipher key number setting section 113 of the transmitter 100 sets a cipher key number N(ks) so that a corresponding one of the pre-stored cipher keys ks may be selected. The cipher key number N(ks) thus set is converted to a corresponding cipher key ks at the cipher key table 112, and the cipher key ks is used at the data enciphering section 111. Also, the cipher key number N(ks) is notified to the receiving side via the cipher key number sending section 114 and the multiplexing section 115. The error-detecting code is affixed to the input data at the error-detection coding section 110, and the data is enciphered at the data enciphering section 111.

In the receiver 200, the separating section 210 separates the cipher key number from the multiplexed data, and the cipher key number thus separated is supplied to the cipher key number receiving section 211. The received cipher key number may have become erroneous during transmission via the transmission line 300, and thus is indicated at N(ks)'. Assuming that the received cipher key number N(ks)' equals the correct cipher key number N(ks), the cipher key determining section 215 refers to the cipher key table 212 and selects a cipher key ks corresponding to the received cipher key number N(ks), and the data deciphering section 213 deciphers the data by using the selected cipher key ks. Using the error-detecting code, the error detecting section 214 determines whether the error-detection coded data deciphered by the data deciphering means 213 contains an error. If an error is detected, the error detecting section 214 outputs error-detection information ERR. On receiving the error detection information ERR from the error detecting section 214, the cipher key determining section 215 determines whether the error has occurred accidentally on the transmission line 300 or has occurred because the cipher key is in error. If the error rate is high and thus it is judged that the cipher key is in error, the cipher key number is changed to a new one and the deciphering is carried out again using a cipher key corresponding to the new cipher key number. Change of the cipher key number is repeated until no error is detected by the error detecting section 214 or the error rate becomes smaller than a predetermined error rate.

Figure 3:
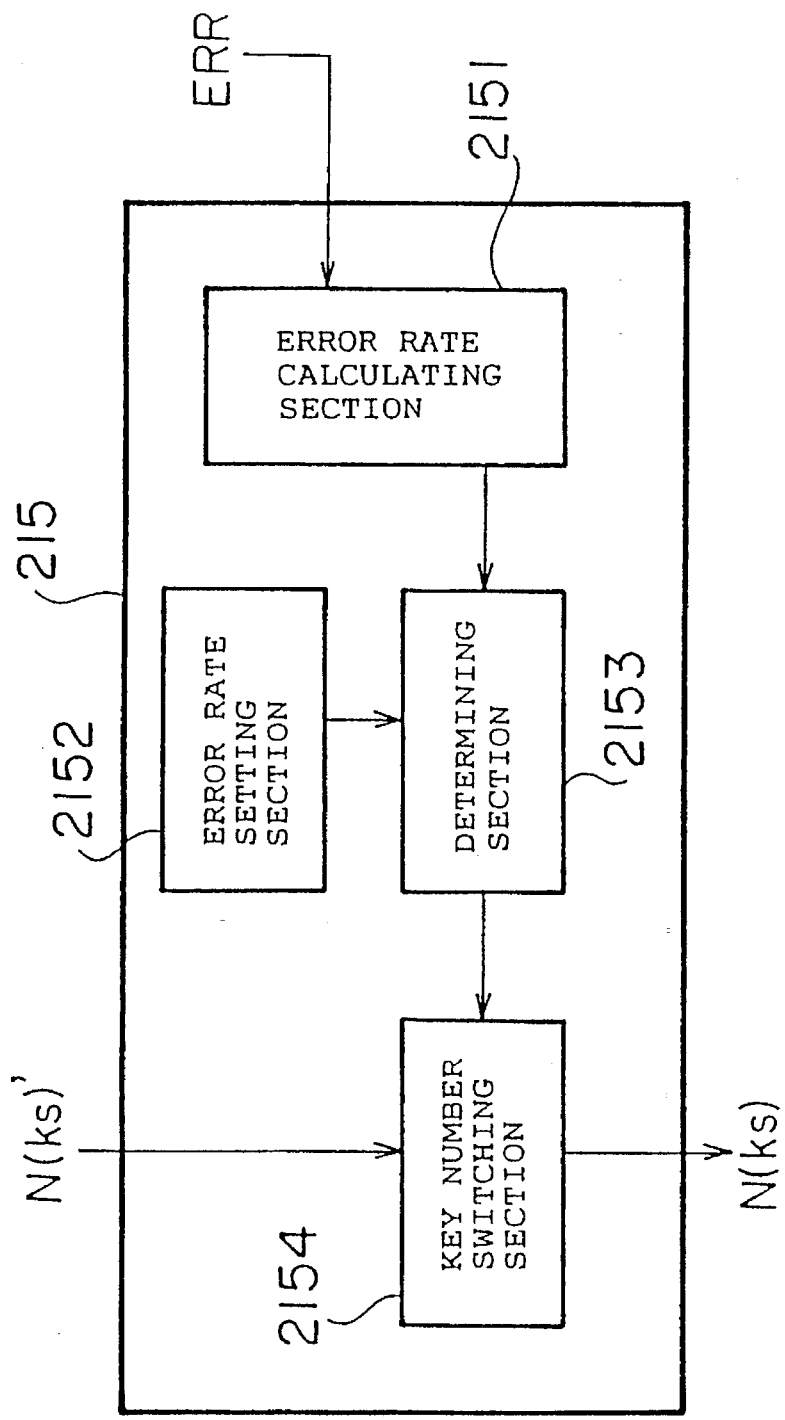
FIG. 3 is a diagram showing an example of the arrangement of a cipher key determining section.

FIG. 3 shows an example of the arrangement of the cipher key determining section. As illustrated, the cipher key determining section 215 comprises an error rate calculating section 2151 for receiving the error detection information ERR from the error detecting section 214, an error rate setting section 2152, a determining section 2153, and a key number switching section 2154 for receiving and holding the cipher key number N(ks)' supplied from the cipher key number receiving section 211 and supplying the cipher key number to the cipher key table 212 as the cipher key number N(ks).

The error rate calculating section 2151 calculates the error rate based on the error detection information ERR supplied from the error detecting section 214. The determining section 2153 compares the error rate calculated by the error rate calculating section 2151 with an error rate set by the error rate setting section 2152, judges that a transmission error has occurred on the transmission line 300 if the error rate is low, and judges that the cipher key used in the data deciphering section 213 is in error if the calculated error rate is higher than the set error rate. When it is judged that the cipher key is in error, the key number switching section 2154 changes the cipher key number corresponding to the cipher key number N(ks)' received by the cipher key number receiving section 211 to another cipher key number. For example, where the cipher key number N(ks)=1 has been output in response to the input of the cipher key number N(ks)' another cipher key number N(ks)=2 is output. This switching operation is successively carried out among the cipher key numbers corresponding to a plurality of preset cipher keys, and is repeated until the error rate becomes smaller than or equal to the value set by the error rate setting section 2152.

Figure 4:
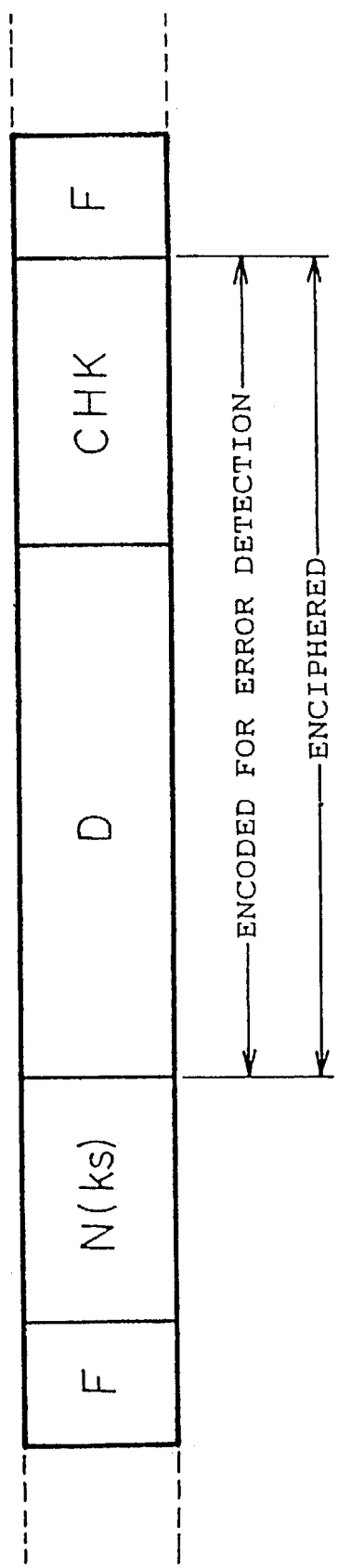
FIG. 4 is a diagram schematically showing data on a transmission line of the enciphered communication system according to the first embodiment.

FIG. 4 schematically illustrates data on the transmission line of the enciphered communication system according to the first embodiment. As illustrated, the data transmitted onto the transmission line 300 includes input data D supplied to the transmitter 100 and a check bit CHK affixed to the data D at the error-detection coding section 110, the data D and the check bit CHK being encoded for the error detection and further enciphered. Also, frame synchronizing signals F are affixed to the enciphered data. When the cipher key number is changed by the cipher key number setting section 113 of the transmitter 100, a newly set cipher key number N(ks) is inserted at the beginning of the data D, for example, and transmitted, as shown in FIG. 4.

Figure 5:
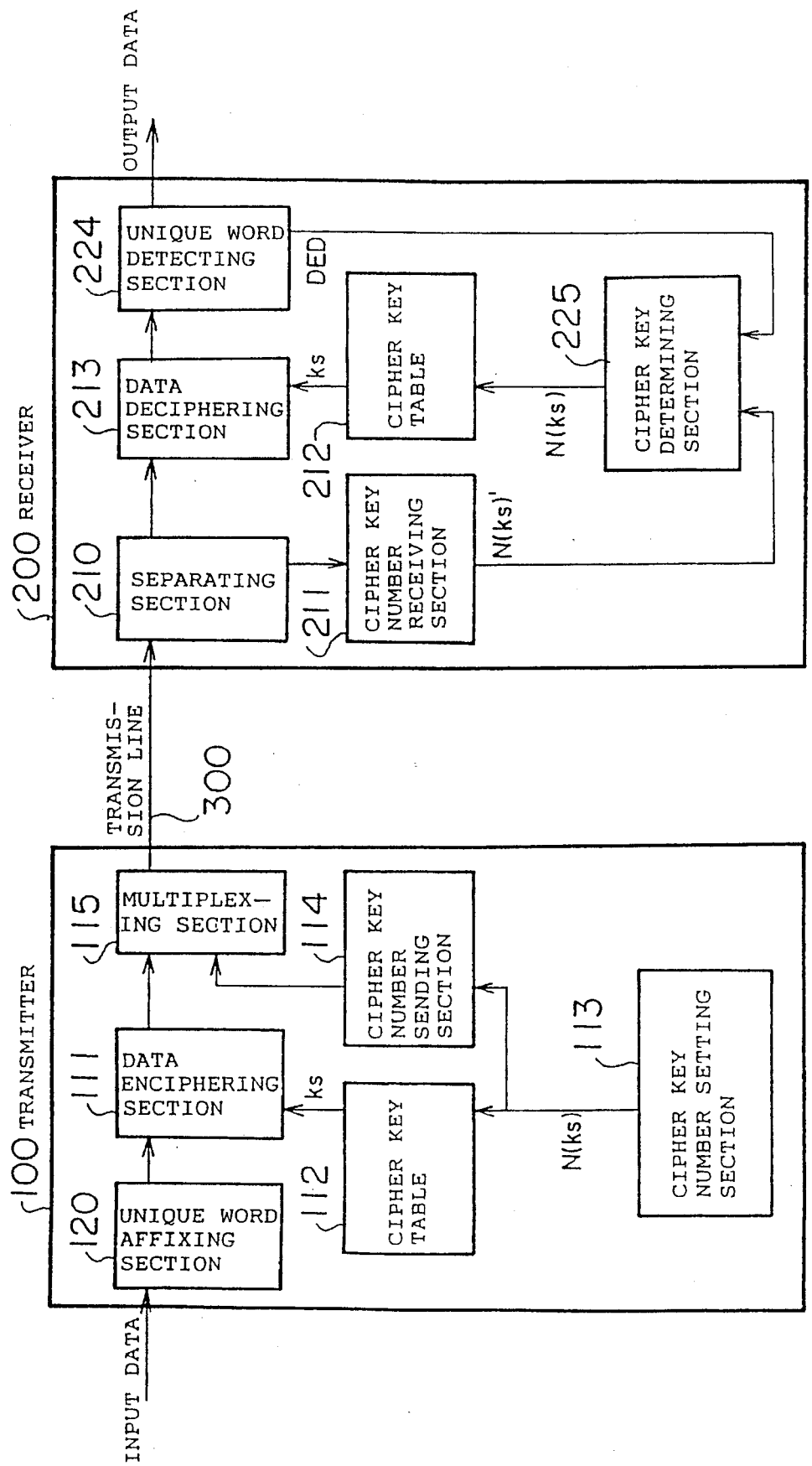
FIG. 5 is a diagram illustrating the configuration of an enciphered communication system according to a second embodiment of the present invention.

FIG. 5 illustrates the configuration of an enciphered communication system according to a second embodiment of the present invention. The second embodiment differs from the first embodiment in that a unique word is used in place of the error-detecting code.

Specifically, the transmitter 100 has a unique word affixing section 120 for receiving input data and affixing a unique word to the input data. In general, the unique word is data having a certain number of bits with a specific bit pattern (bit sequence) that cannot occur in other data and thus greatly differs therefrom, and constitutes a word having a value such that it can be identified as a unique word as a whole even if one bit thereof is erroneous.

The transmitter 100 has the same arrangement as that of the first embodiment except for the unique word affixing section 120, and includes the data enciphering section 111, the cipher key table 112, the cipher key number setting section 113, the cipher key number sending section 114, and the multiplexing section 115.

The arrangement of the receiver 200 is similar to that of the first embodiment in that it includes the separating section 210, the cipher key number receiving section 211, the cipher key table 212 having the same contents as the cipher key table 112 of the transmitter 100, and the data deciphering section 213. The receiver 200 is further provided with a unique word detecting section 224 and a cipher key determining section 225.

In this embodiment, the input data is not encoded for the error detection. Instead, the transmitting side merely affixes a unique word to input data and enciphers the two for transmission, and the receiving side determines whether the unique word is correctly detected from the deciphered data, to thereby determine whether the cipher key used is correct. The detection of the unique word is carried out by the unique word detecting section 224 of the receiver 200, and when the unique word is detected, the unique word detecting section 224 outputs unique word detection information DED. When the unique word is not correctly detected, information DED representing non-detection of unique word is output. On receiving the unique word detection information DED, the cipher key determining section 225 calculates the rate at which the unique word is not detected, i.e., the non-detection rate of unique word. If the non-detection rate of unique word increases, the determining section 225 judges that such increase is caused not by an error of the transmission line 300 but because a different cipher key is used, and thus changes the cipher key number.

Figure 6:
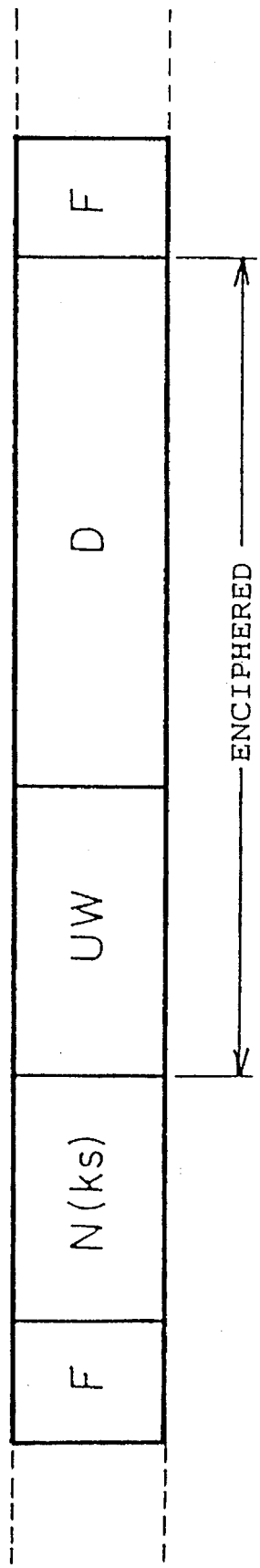
FIG. 6 is a diagram schematically showing data on a transmission line of the enciphered communication system according to the second embodiment.

FIG. 6 schematically illustrates data on the transmission line of the enciphered communication system according to the second embodiment. As illustrated, the data transmitted onto the transmission line 300 includes input data D supplied to the transmitter 100 and a unique word UW simply affixed to the beginning of the data D at the unique word affixing section 120, the data D and the unique word UW being enciphered. Also, frame synchronizing signals F are affixed to the enciphered data. When the cipher key number is changed by the cipher key number setting section 113 of the transmitter 100, a newly set cipher key number N(ks) is inserted at the beginning of the enciphered data, for example, and transmitted, as shown in FIG. 6.

Figure 7:
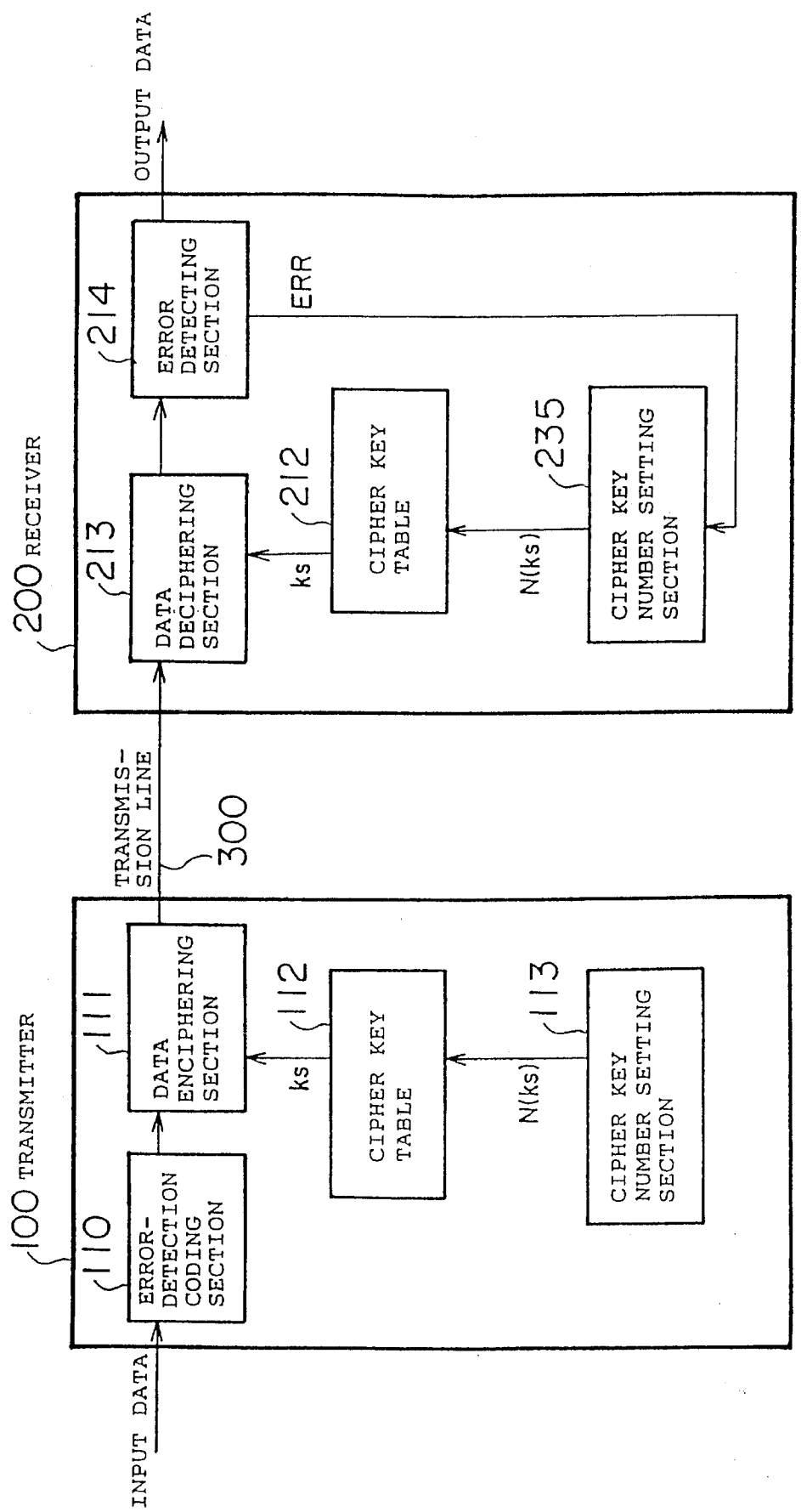
FIG. 7 is a diagram illustrating the configuration of an enciphered communication system according to a third embodiment of the present invention.

FIG. 7 illustrates the configuration of an enciphered communication system according to a third embodiment of the present invention. This embodiment differs from the first embodiment in that the cipher key number selected by the cipher key number setting section 113 is not transmitted to the receiving side.

Specifically, the transmitter 100 is composed only of the error-detection coding section 110 for receiving input data and affixing an error-detecting code to the input data, the data enciphering section 111 for enciphering the input data by means of a cipher key ks, the cipher key table 112 for converting a specified number N(ks) to a corresponding cipher key ks, and the cipher key number setting section 113 for setting a number N(ks) by which a cipher key ks in the cipher key table 112 is selected to be used for enciphering the input data. In this arrangement, the data enciphering section 111, the cipher key table 112, and the cipher key number setting section 113 correspond to the enciphering means 102 in FIG. 1 illustrating the principles of the present invention.

The receiver 200 includes the cipher key table 212 having the same contents as the cipher key table 112 of the transmitter 100, and the data deciphering section 213 for deciphering the enciphered data transmitted via the transmission line 300 by using the cipher key ks, these elements corresponding to the deciphering means 201 in FIG. 1 illustrating the principles of the invention. The receiver 200 further includes the error detecting section 214 for detecting the error-detecting code from the data deciphered by the data deciphering section 213 to identify an erroneous bit(s), and a cipher key determining section 235 for changing the cipher key used for the deciphering, in accordance with the number of errors detected within a fixed time by the error detecting section 214. The error detecting section 214 corresponds to the appendant data detecting means 202 in FIG. 1, and the cipher key determining section 235 corresponds to the cipher key determining means 203.

In this embodiment, a data error is detected in the receiver 200, the error rate is calculated by the cipher key determining section 235 based on the error detection information ERR, and when the error rate is smaller than a set value, the cipher key used for the deciphering is regarded as identical with the cipher key used in the transmitter 100. Conversely, if the error rate is greater than the set value, it is judged that the cipher key has been changed; therefore, the cipher key is changed. Change of the cipher key number is repeated until no error is detected by the error detecting section 214 or the error rate becomes smaller than a preset error rate. When the error rate becomes smaller than the set value as a result of successive changes of the cipher key number, the cipher key corresponding to the then set cipher key number is regarded as identical with the cipher key used in the data enciphering section 111 of the transmitter 100.

Figure 8:
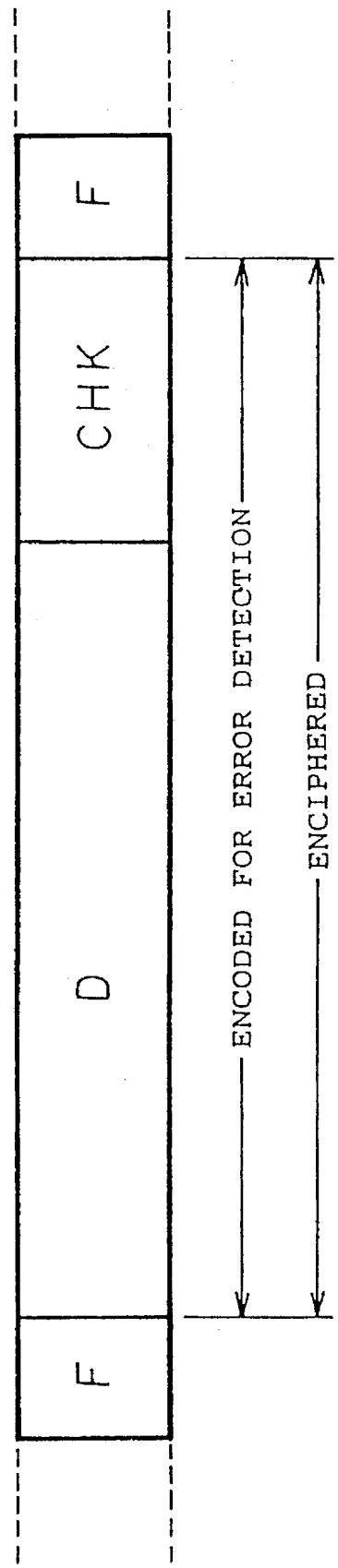
FIG. 8 is a diagram schematically showing data on a transmission line of the enciphered communication system according to the third embodiment.

FIG. 8 schematically illustrates data on the transmission line of the enciphered communication system according to the third embodiment. As illustrated, the data transmitted onto the transmission line 300 includes input data D supplied to the transmitter 100 and a check bit CHK affixed to the input data D at the error-detection coding section 110, the data D and the check bit CHK being encoded for the error detection and further enciphered. Also, frame synchronizing signals F are affixed to the enciphered data. Even when the cipher key number is changed to a new one by the cipher key number setting section 113 of the transmitter 100, the new cipher key number is not transmitted to the receiving side.

Figure 9:
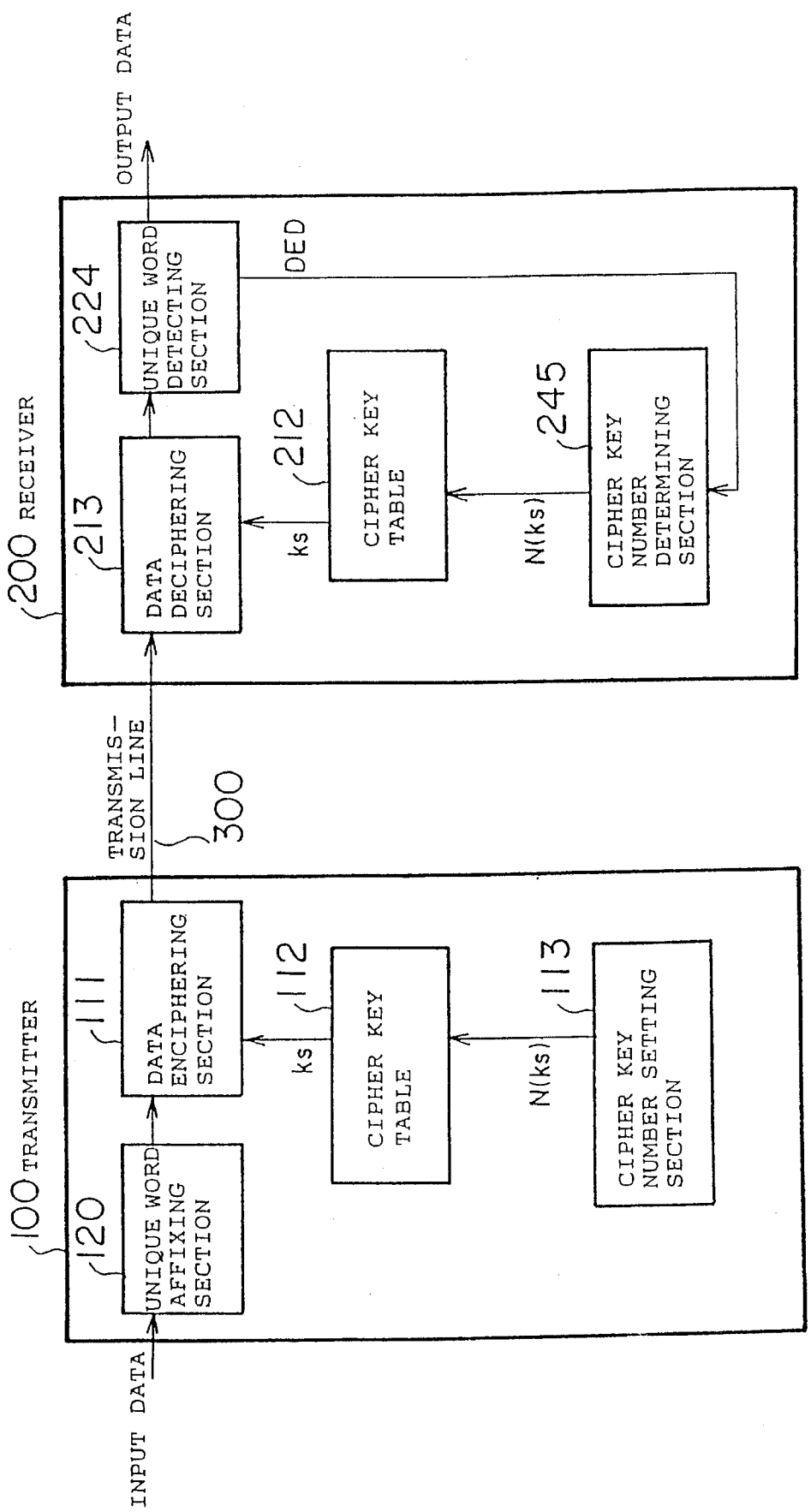
FIG. 9 is a diagram illustrating the configuration of an enciphered communication system according to a fourth embodiment of the present invention.

FIG. 9 illustrates the configuration of an enciphered communication system according to a fourth embodiment of the present invention. This embodiment differs from the third embodiment in that a unique word is used in place of the error-detecting code.

Specifically, the transmitter 100 includes a unique word affixing section 120 for receiving input data and affixing a unique word to the input data. For the other parts, the arrangement of the transmitter 100 is identical to that of the third embodiment; the transmitter 100 includes the data enciphering section 111, the cipher key table 112, and the cipher key number setting section 113.

The receiver 200 is similar to the counterpart of the third embodiment in that it includes the cipher key table 212 having the same contents as the cipher key table 112 of the transmitter 100, and the data deciphering section 213. The receiver 200 is further provided with a unique word detecting section 224 and a cipher key determining section 245.

In this embodiment, if no unique word is detected by the unique word detecting section 224 of the receiver 200, it is judged that an erroneous cipher key is used in the data deciphering section 213; therefore, the cipher key is changed so as to find a cipher key with which the unique word can be detected. When the unique word is detected, it is judged that the cipher key then used is correct, and the data is deciphered using this cipher key.

Figure 10:
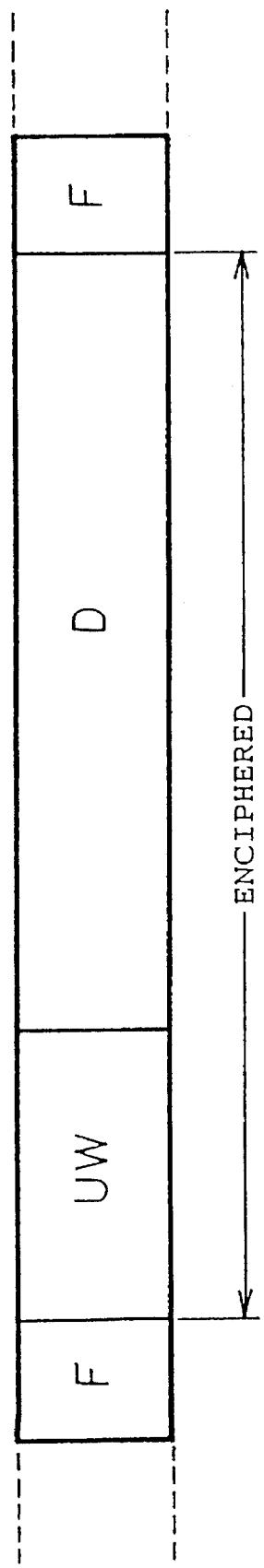
FIG. 10 is a diagram schematically showing data on a transmission line of the enciphered communication system according to the fourth embodiment.

FIG. 10 schematically illustrates data on the transmission line of the enciphered communication system according to the fourth embodiment. As shown in the figure, the data transmitted onto the transmission line 300 includes input data D supplied to the transmitter 100 and a unique word UW affixed to the beginning of the data D at the unique word affixing section 120, the unique word UW and the data D being enciphered. Also, frame synchronizing signals F are affixed to the enciphered data. Even when the cipher key number is changed, the data transmitted from the transmitter 100 does not include information about the cipher key number.

Figure 11:
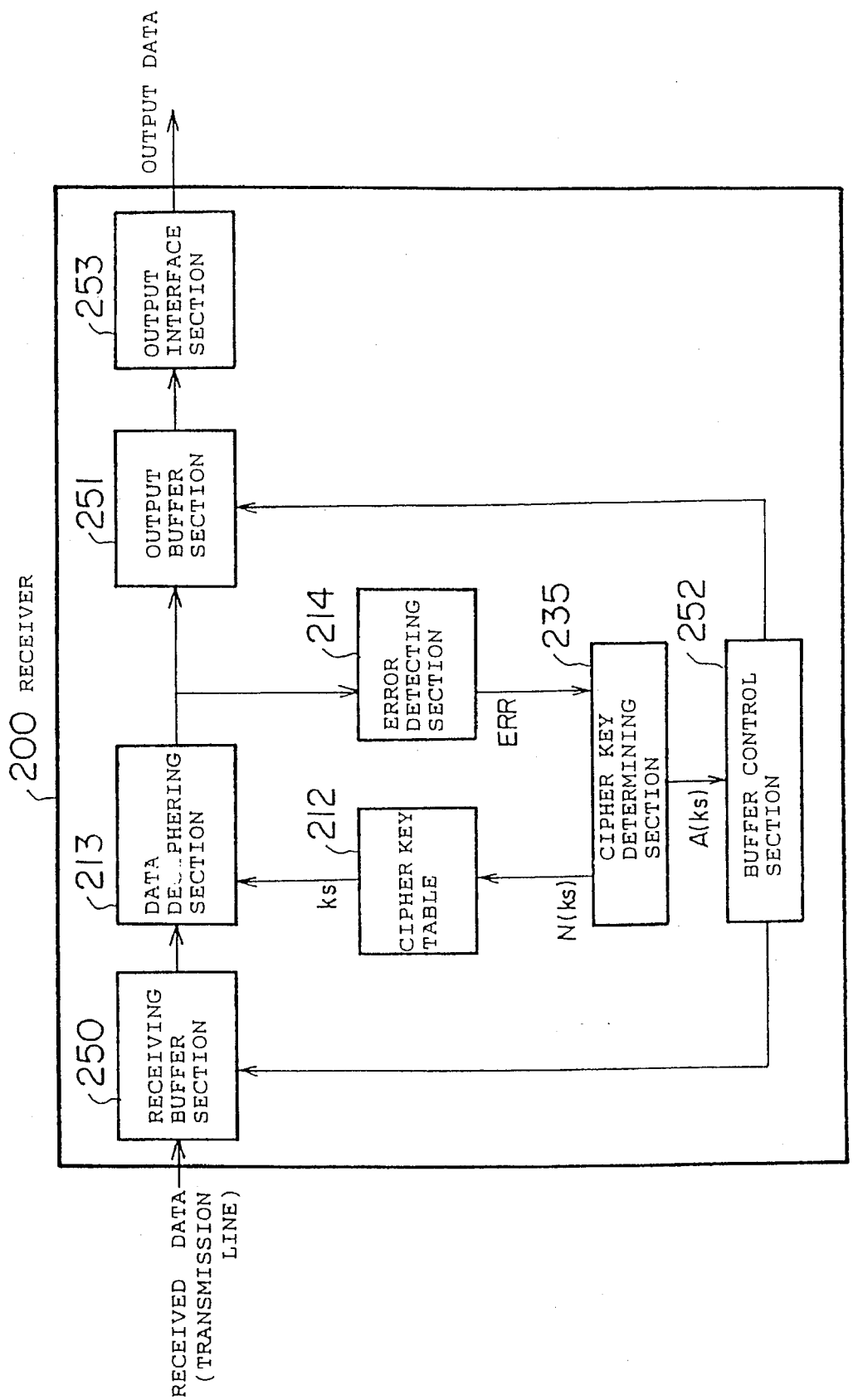
FIG. 11 is a diagram illustrating the configuration of an enciphered communication system according to a fifth embodiment of the present invention.

FIG. 11 illustrates the configuration of an enciphered communication system according to a fifth embodiment of the present invention. This embodiment is shown as another example of the arrangement of the receiver in FIG. 7.

The receiver 200 has an arrangement similar to that of the embodiment shown in FIG. 7; that is, it includes the cipher key table 212, the data deciphering section 213, the error detecting section 214, and the cipher key determining section 235. In addition, the receiver 200 includes a receiving buffer section 250 for receiving and accumulating data from the transmission line 300, an output buffer section 251 for accumulating data deciphered by the data deciphering section 213, a buffer control section 252 for controlling the receiving buffer section 250 and the output buffer section 251, and an output interface section 253. To permit the calculation of the error rate, the receiving buffer section 250 can accumulate enciphered data corresponding in quantity to a plurality of successive frames, and has a capacity large enough to store at least the data received while all of the cipher keys are switched for the error checking.

The following is a description of the operation when the cipher keys coincide.

Received data is first accumulated in the receiving buffer section 250. Then, the buffer control section 252 instructs the receiving buffer section 250 to transfer the data accumulated therein to the data deciphering section 213. The transferred data is deciphered by means of the cipher key ks at the data deciphering section 213. The deciphered data is accumulated in the output buffer section 251 and is also subjected to the error detection at the error detecting section 214. When the cipher keys used at the transmitting and receiving sides are the same, the deciphered data contains almost no error; therefore, error detected by the error detecting section 214 and represented by the error detection information ERR is small and the error rate calculated by the cipher key determining section 235 is low. In this case, the cipher key determining section 235 judges that the cipher key used is correct, and notifies the result of determination, A(ks), to the buffer control section 252. On receiving the information A(ks) indicating that the cipher key is correct, the buffer control section 252 supplies an output enabling signal to the output buffer section 251 to cause the data accumulated therein to be supplied to the output interface section 253, and also supplies a deletion signal to the receiving buffer section 250 to delete the corresponding data.

When the cipher keys used are different, the following operation is executed:

First, the buffer control section 252 instructs the receiving buffer section 250 to transfer the received data to the data deciphering section 213. Since different cipher keys are used, the data deciphered by the data deciphering section 213 contains numerous errors, and this data containing numerous errors is accumulated as it is in the output buffer section 251. The error detecting section 214 detects the errors and supplies error detection information ERR to the cipher key determining section 235. The cipher key determining section 235 detects a high error rate and judges that an erroneous cipher key is used. Accordingly, the cipher key determining section 235 notifies a new cipher key number different from the currently used cipher key number to the cipher key table 212, and also notifies information A(ks) indicating that the cipher key is in error to the buffer control section 252. The cipher key table 212 sets, in the data deciphering section 213, a cipher key ks corresponding to the new cipher key number N(ks) supplied thereto. The buffer control section 252 requests the receiving buffer section 250 to transfer again the data, which was previously subjected to deciphering, to the data deciphering section 213.

The data deciphering section 213 deciphers the retransferred data by means of the new cipher key, and supplies the deciphered data to the output buffer section 251. The output buffer section 251 accumulates the data deciphered this time, while expelling or deleting in advance the previously accumulated data. If the deciphered data contains no error, it is judged that the newly set cipher key is correct; therefore, the buffer control section 252 causes the output buffer section 251 to supply the accumulated data to the output interface section 253, and requests the receiving buffer section 250 to delete the corresponding data stored therein. If the data deciphered using the new cipher key still shows a high error rate, the cipher key is again changed, and this process is repeated until it is judged that the cipher key is correct.

According to this arrangement, the received data is once accumulated, and if the data fails to be deciphered by means of a correct cipher key, the deciphering is repeatedly performed on the accumulated data until the correct cipher key is found, whereby the transmitted data can be in its entirety received accurately without being lost halfway.

Although in this embodiment, the receiving buffer section 250, the output buffer section 251, the buffer control section 252 and the output interface section 253 are added to the receiver shown in FIG. 7, these elements are equally applicable to the receivers shown in FIGS. 2, 5 and 9.

Figure 12:
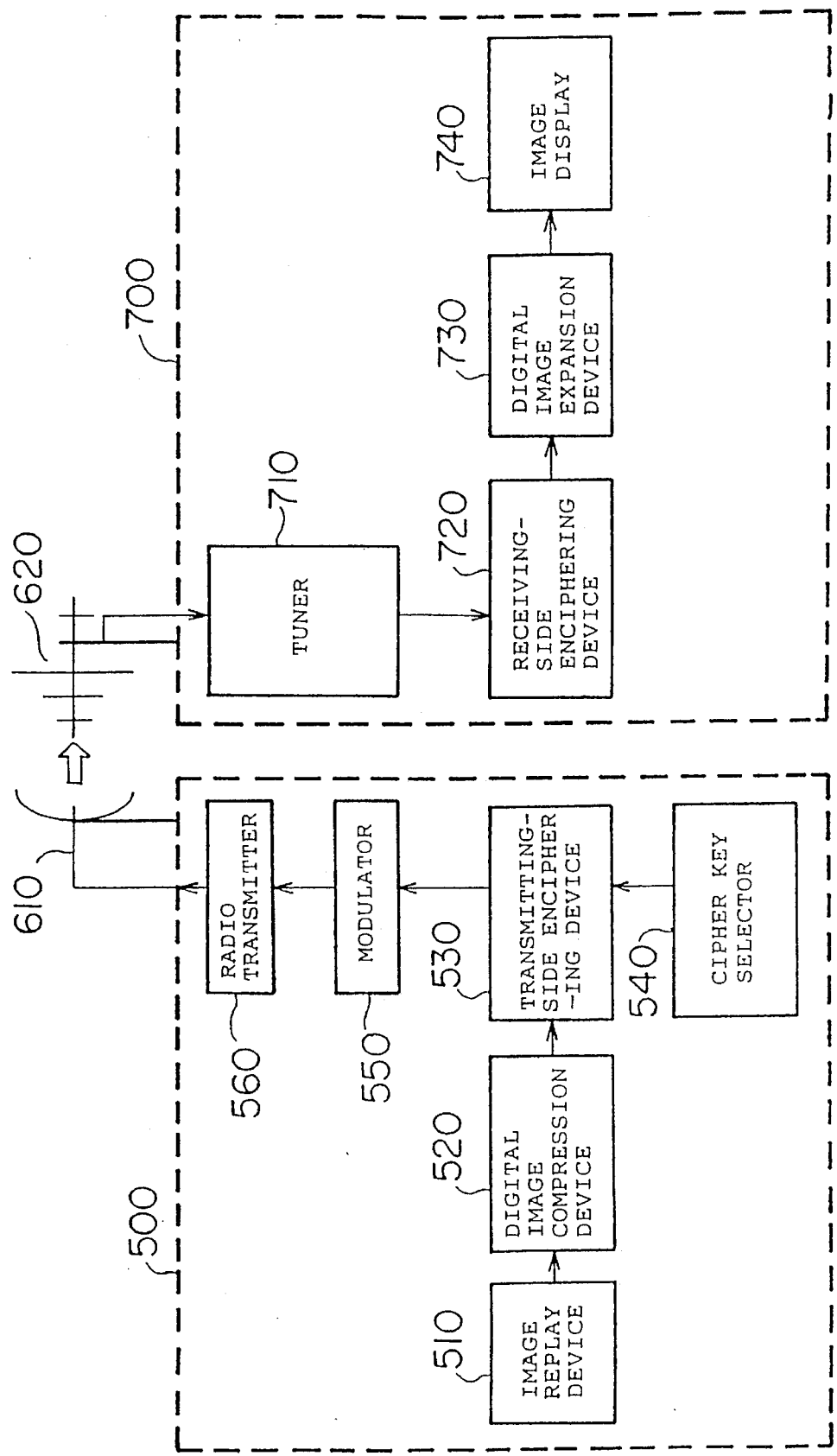
FIG. 12 is a diagram showing an example wherein the enciphered communication system of the present invention is applied to digital image broadcasting.

FIG. 12 illustrates, by way of example, the configuration of an enciphered communication system of the present invention which is applied to digital image broadcasting. As shown in the figure, a transmitting station 500 comprises an image replay device 510 for reproducing an analog video signal, such as a video tape recorder, a digital image compression device 520 for digitizing and compressing the analog video signal, a transmitting-side enciphering device 530, a cipher key selector 540, a modulator 550, and a radio transmitter 560. The cipher key selector 540 constitutes part of the cipher key number setting section incorporated in the transmitting-side enciphering device 530, and its manual operating part alone is separated from the enciphering device 530 and located, e.g., near the image replay device 510, for ease of manipulation when the cipher key number is changed. The output of the radio transmitter 560 is connected to a transmitting antenna 610.

A receiving station 700 comprises a tuner 710 for receiving the output of a receiving antenna 620, a receiving-side enciphering device 720, a digital image expansion device 730 for expanding the compressed digital video data and converting the expanded data to an analog video signal, and an image display 740.

The transmitting-side enciphering device 530 is of the type which performs error-detection coding on the digital video data and which does not transmit the cipher key number to the receiving side. The following describes the operation of the digital image broadcasting system when the cipher key number is changed by the cipher key number selector 540:

In the transmitting station 500, on receiving a cipher key change command from the cipher key selector 540, the transmitting-side enciphering device 530 reads out the specified cipher key from the cipher key table, and sets the read cipher key in the data enciphering section thereof. The analog signal output from the image replay device 510 is converted to digital data by the digital image compression device 520, the digital data being supplied to the transmitting-side enciphering device 530. The transmitting-side enciphering device 530 carries out error-detection coding on the input data and also enciphers the data by means of the set cipher key. The enciphered data is converted to a radio output signal via the modulator 550 and the radio transmitter 560, and then transmitted from the transmitting antenna 610.

In the receiving station 700, the signal received by the receiving antenna 620 is subjected to conversion and demodulation at the tuner 710, and then supplied to the receiving-side enciphering device 720. In the receiving-side enciphering device 720, the input data is deciphered by the data deciphering section in which a previous cipher key (before change) is set, and then subjected to error detection. Since the data deciphering section deciphers the data by using the cipher key different from that used at the transmitting side for the enciphering, a data error is detected by the data detecting section. If the rate of the error detected is greater than a fixed error rate, it is judged that a wrong cipher key is used; therefore, preset cipher keys are successively set in the data deciphering section. When the error rate becomes smaller than or equal to the fixed value, it is judged that the cipher key then set is identical to that to which the cipher key has been changed at the transmitting side, and data can thereafter be deciphered accurately by means of the new cipher key. The deciphered data is expanded and then converted to an analog video signal at the digital image expansion device 730, and finally displayed at the image display 740.

FIG. 13 schematically illustrates data at various parts in the digital image broadcasting system. In FIG. 13, the top row "ANALOG VIDEO SIGNAL" schematically illustrates the signal output from the image replay device 510 of the transmitting station 500. The second row "DIGITAL COMPRESSED VIDEO DATA" represents the image data digitized and compressed by the digital image compression device 520, wherein a frame synchronizing signal F is inserted at the beginning of each image data. "ENCIPHERED DATA" indicates the output signal of the transmitting-side enciphering device 530, wherein each image data is enciphered together with the error-detecting code or check bit CHK. The row "RADIO WAVE" represents the signal radiated in the air from the transmitting antenna 610 and received by the receiving antenna 620. "RECEIVED DATA" indicates the demodulated data output from the tuner 710; the data is identical with the enciphered data if no error occurs during the aerial transmission. The second row from the bottom, "DIGITAL COMPRESSED VIDEO DATA," denotes the digital data signal which is deciphered by the receiving-side enciphering device 720 and in which the image data is compressed. The bottom row "ANALOG VIDEO SIGNAL" indicates the signal supplied to the image display 740, the signal being obtained by restoring the compressed image data at the digital image expansion device 730 and converting the restored data to an analog signal.

Figure 14:
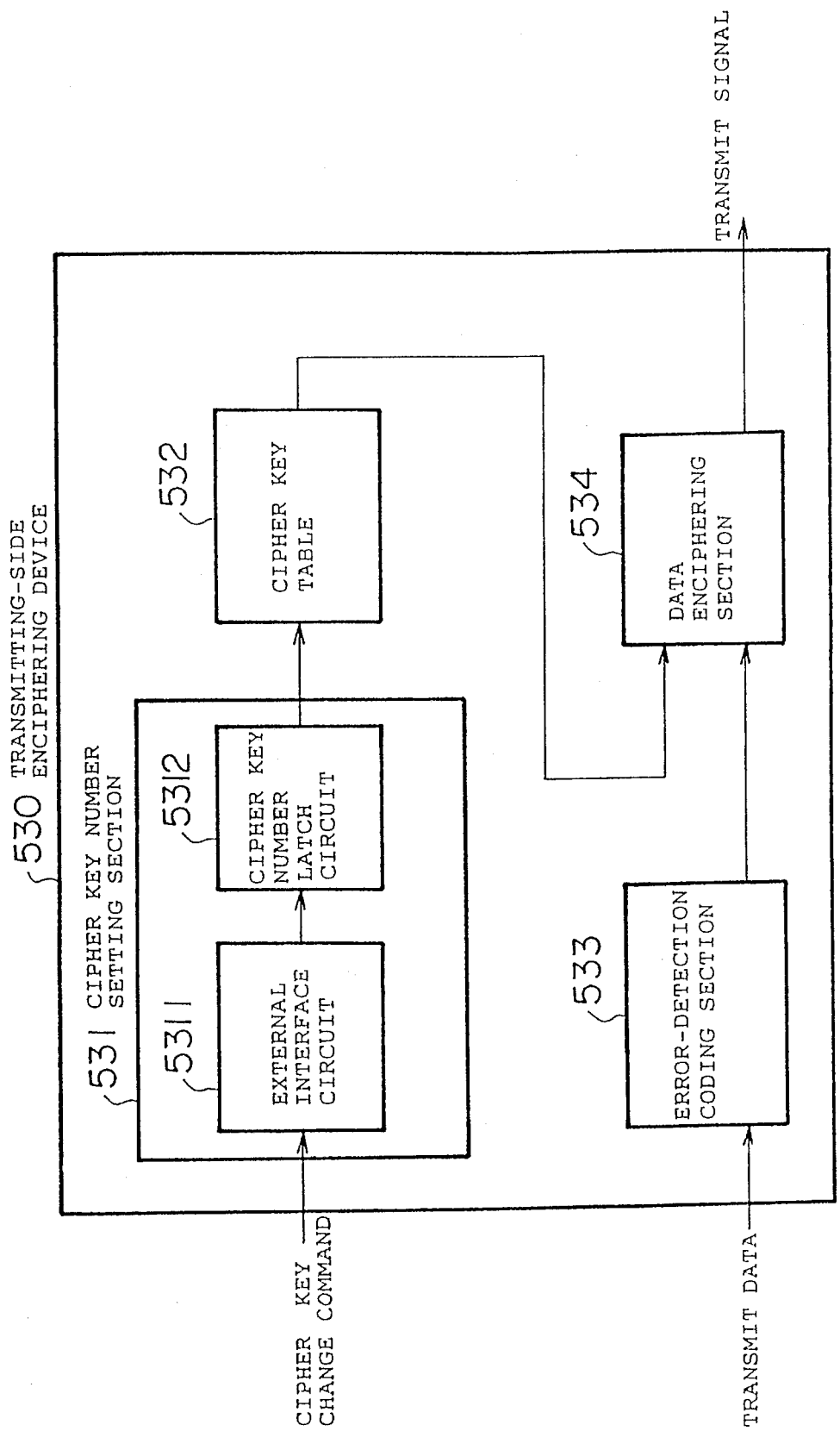
FIG. 14 is a diagram showing an example of the arrangement of a transmitting-side enciphering device in the digital image broadcasting system.

FIG. 14 shows an example of the arrangement of the transmitting-side enciphering device in the digital image broadcasting system. As illustrated, the transmitting-side enciphering device 530 comprises a cipher key number setting section 531 to which the cipher key change command is supplied from the cipher key selector 540, a cipher key table 532 formed by a ROM and storing a plurality of cipher keys in relation to the cipher key numbers, an error-detection coding section 533 for affixing a parity code to the transmit data supplied from the digital image compression device 520, and a data enciphering section 534 formed by, e.g., a DES coding LSI, for enciphering the transmit data, to which the parity code has been affixed, by using a cipher key corresponding to the cipher key number set by the cipher key number setting section 531. The cipher key number setting section 531 includes an external interface circuit 5311 and a cipher key latch circuit 5312.

When the cipher key change command is supplied from the cipher key selector 540 to the cipher key number setting section 531 of the transmitting-side enciphering device 530, the command is input via the external interface circuit 5311 to the cipher key latch circuit 5312 and is latched thereat. Consequently, the cipher key is set in the transmitting-side enciphering device 530. Based on the latched cipher key number, a corresponding cipher key is selected from the cipher key table 532. Subsequently, the transmit data, which has been subjected to error-detection coding at the error-detection coding section 533, is enciphered at the data enciphering section 534 by means of the selected cipher key. The enciphered data is supplied to the modulator 550 as a transmit signal.

Figure 15:
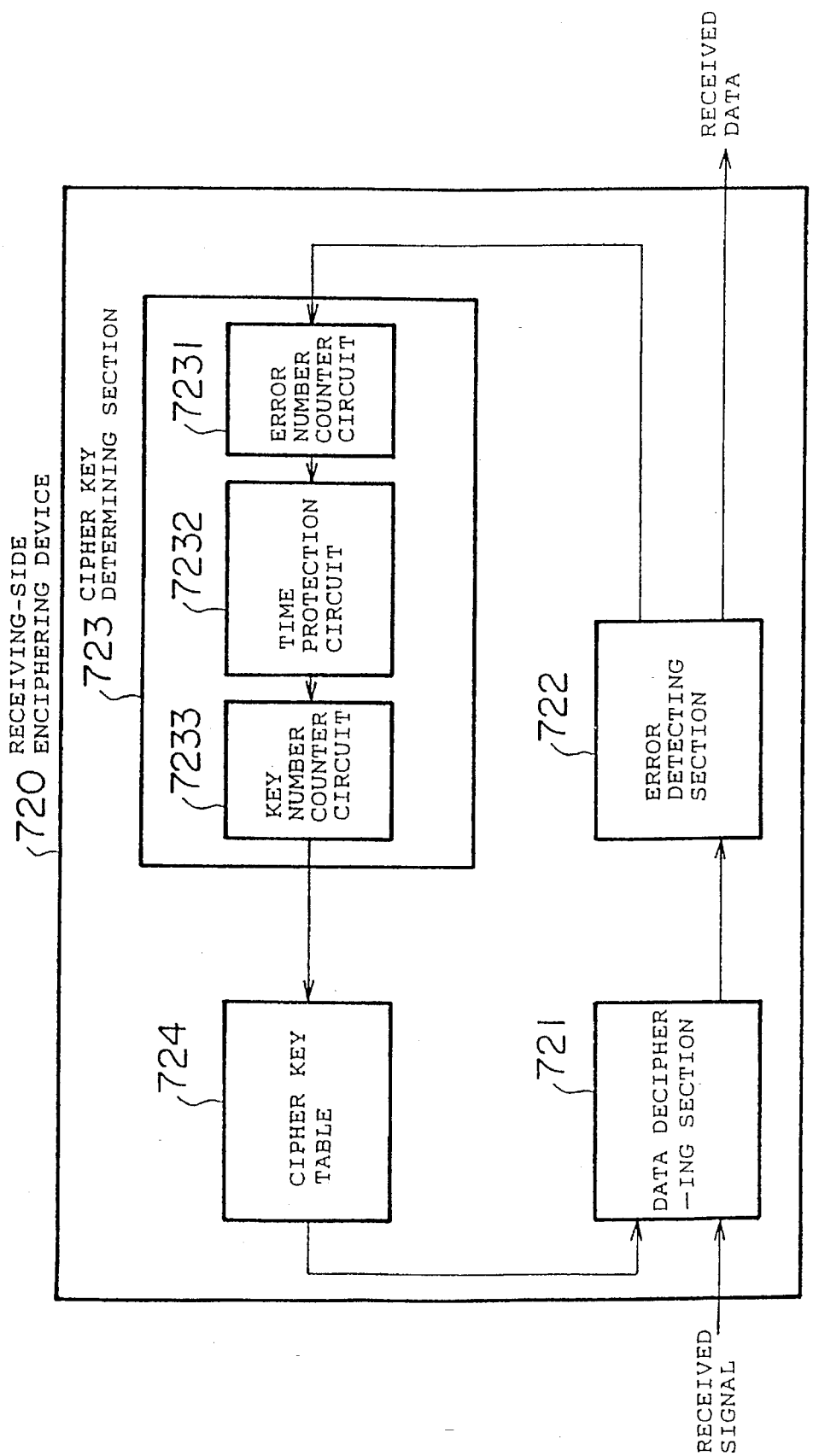
FIG. 15 is a diagram showing an example of the arrangement of a receiving-side enciphering device in the digital image broadcasting system.
Figure 16:
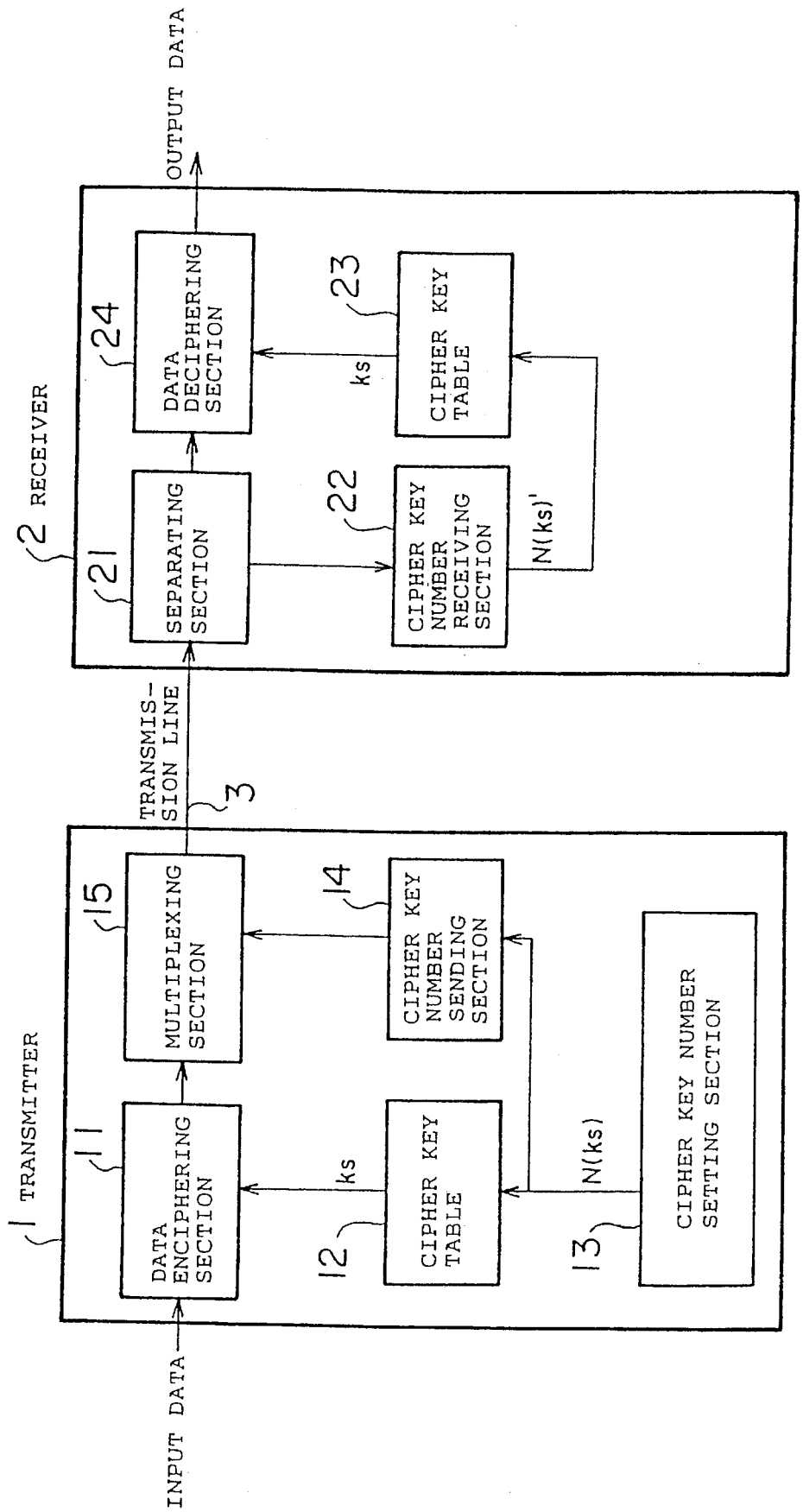
FIG. 16 is a diagram illustrating the configuration of a conventional enciphered communication system.
Figure 17:
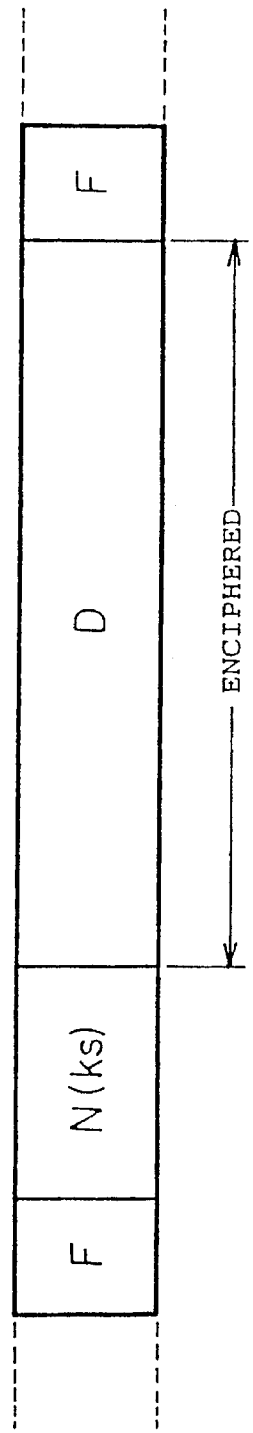
FIG. 17 is a diagram schematically showing data on a transmission line of the conventional enciphered communication system.

FIG. 15 shows, by way of example, the arrangement of the receiving-side enciphering device in the digital image broadcasting system. As illustrated in FIG. 15, the receiving-side enciphering device 720 comprises a data deciphering section 721 formed by, e.g., a DES coding LSI, for receiving the signal from the tuner 710, an error detecting section 722 constituting a parity check circuit, a cipher key determining section 723, and a cipher key table 724 formed by a ROM and identical with the cipher key table 532 of the transmitting-side enciphering device 530. The cipher key determining section 723 includes an error number counter circuit 7231 for counting the number of errors based on error information supplied from the error detecting section 722, a time protection circuit 7232 for calculating the error rate from, e.g., the number of errors per minute, and a key number counter circuit 7233 for successively changing the cipher key number in accordance with the calculated error rate.

The data deciphering section 721 deciphers the received signal by means of the cipher key supplied thereto from the cipher key table 724. In this case, if the cipher key is identical with that used at the transmitting side, the received signal is deciphered accurately; if the former differs from the latter, the received signal is converted to invalid data. The deciphered data is subjected to parity check at the error detecting section 722, and image data from which the check bit has been removed is supplied to the digital image expansion device 730 as received data. If an error is detected by the parity check, the error detecting section 722 supplies error information to the cipher key determining section 723. The error information is counted by the error number counter circuit 7231, and the error rate is calculated by the time protection circuit 7232. When the error rate becomes greater than a predetermined value, the count value of the key number counter circuit 7233 is incremented by one, thereby to successively change the cipher key number. Consequently, the subsequently received signal is deciphered by means of the cipher key corresponding to the newly set cipher key number.

As described above, according to the present invention, the transmitting side affixes appendant data to information to be enciphered, the receiving side detects the appendant data from the deciphered data, and if the appendant data fails to be detected accurately, the cipher key of the receiving side is successively changed. Accordingly, when the cipher key used is changed, the receiving side can restore data by itself even if the cipher key number used at the transmitting side fails to be accurately transmitted to the receiving side.

Further, even in cases where the cipher key number is not actively transmitted to the receiving side, the reliability and secrecy of the enciphered data communication system can be enhanced because the receiving side itself can change the cipher key.

Furthermore, where the buffer means is used so as to output deciphered data only when the deciphering is carried out accurately by means of a correct cipher key, all of the transmitted data can be accurately received without being lost.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An enciphered communication system having a plurality of cipher keys to be switched as required, comprising:

a transmitter receiving input data and including appendant data affixing means for affixing to input data appendant data which allows an error on a transmission line to be detected and which is used for changing a cipher key, and enciphering means coupled to said affixing means and having a plurality of cipher keys selectively used for enciphering the input data with the appendant data affixed thereto, output from the appendant data affixing means; and a receiver including deciphering means for receiving and deciphering the enciphered data received via the transmission line, appendant data detecting means for detecting the appendant data affixed to the input data, and cipher key determining means, coupled to said detecting means for measuring an error rate in the detected appendant data and for determining whether a cipher key used for the deciphering is correct, based on the measured error rate of the detected appendant data, and coupled to said deciphering means, for instructing the deciphering means to change the cipher key used for the deciphering when the measured error rate exceeds a predetermined value.

2. The enciphered communication system according to claim 1, wherein the enciphering means includes means for enciphering the input data and the appendant data from the appendant data affixing means in accordance with a set cipher key, and means for multiplexing the enciphered data and a number associated with the cipher key used for the enciphering; and said deciphering means includes means for separating the number of the cipher key used for the enciphering from the received data to acquire a cipher key number to be used for the deciphering, and for changing the cipher key number in accordance with a determination by the cipher key determining means that the cipher key exceeds said predetermined value.

3. The enciphered communication system according to claim 1, wherein said appendant data affixing means comprises an error-detection coding section for encoding the input data by an error-detecting code, and said appendant data detecting means comprises an error detecting section for checking the error-detecting code deciphered by the deciphering means.

4. The enciphered communication system according to claim 1, wherein said appendant data affixing means comprises a unique word affixing section for affixing a unique word to the input data, and said appendant data detecting means comprises a unique word detecting section for checking the unique word deciphered by the deciphering means.

5. A receiver for an enciphered communication system having a plurality of cipher keys to be switched as required, comprising:

deciphering means for deciphering enciphered data received via a transmission line by a preset cipher key;

appendant data detecting means for detecting from the deciphered data appendant data which is affixed to input data and which allows an error on the transmission line to be detected and which is used for changing the cipher key; and cipher key determining means, coupled to said detecting means, for measuring an error rate in the detected appendant data and for determining whether the cipher key used for the deciphering is correct, based on the measured error rate of the detected appendant data, and, coupled to said deciphering means, for causing said deciphering means to change the cipher key when the measured error rate exceeds a predetermined value.

6. The receiver according to claim 5, wherein said deciphering means includes a data deciphering section for receiving the enciphered data transmitted via the transmission line and deciphering the received data by a specified cipher key, and a cipher key table having contents identical to those of a cipher key table of a transmitter sending said input data to the receiver.

7. The receiver according to claim 6, wherein said deciphering means further includes a separating section for receiving the enciphered data transmitted via the transmission line and separating a cipher key number from the enciphered data, and a cipher key number receiving section for receiving the separated cipher key number.

8. The receiver according to claim 5, wherein said appendant data detecting means comprises an error detecting section for checking an error-detecting code deciphered by said deciphering means.

9. The receiver according to claim 5, wherein said cipher key determining means comprises a cipher key determining section for changing the cipher key used for the deciphering, based on an error rate detected by the error detecting section.

10. The receiver according to claim 9, wherein said cipher key determining section includes error rate calculating means for calculating an error rate based on information detected by said appendant data detecting means, determining means for judging that the cipher key used for the deciphering is erroneous when the calculated error rate exceeds said predetermined value, and key number switching means for successively changing a plurality of preset cipher key numbers when it is judged that the cipher key exceeds said predetermined value.

11. The receiver according to claim 5, wherein said appendant data detecting means comprises a unique word detecting section for checking a unique word deciphered by said deciphering means.

12. The receiver according to claim 5, wherein said cipher key determining means comprises a cipher key determining section for changing the cipher key used for the deciphering, in accordance with a non-detection rate of unique word detected by the unique word detecting section.

13. The receiver according to claim 5, further comprising receiving buffer means for accumulating the received enciphered data, output buffer means for accumulating data deciphered by said deciphering means, and buffer control means for instructing the receiving buffer means to transfer the received data to said deciphering means, said buffer control means instructing the receiving buffer means to delete corresponding data when the deciphered data is accurate, and also instructing the output buffer means to output the deciphered data as valid data when the deciphered data is accurate.

* * * * *